United States Patent
Braun et al.

(10) Patent No.: US 9,947,953 B2
(45) Date of Patent: Apr. 17, 2018

(54) HIGH EFFICIENCY, REVERSIBLE FLOW BATTERY SYSTEM FOR ENERGY STORAGE

(75) Inventors: Robert J. Braun, Golden, CO (US); Robert J. Kee, Golden, CO (US); Scott Barnett, Evanston, IL (US)

(73) Assignee: Colorado School of Mines, Golden, CO (US)

( * ) Notice: Subject to any disclaimer, the term of this patent is extended or adjusted under 35 U.S.C. 154(b) by 1615 days.

(21) Appl. No.: 13/554,468

(22) Filed: Jul. 20, 2012

(65) Prior Publication Data

US 2012/0282534 A1 Nov. 8, 2012

Related U.S. Application Data

(63) Continuation-in-part of application No. 13/432,219, filed on Mar. 28, 2012, now Pat. No. 8,637,197.

(60) Provisional application No. 61/468,312, filed on Mar. 28, 2011.

(51) Int. Cl.
| | |
|---|---|
| H01M 8/04 | (2016.01) |
| H01M 8/12 | (2016.01) |
| H01M 8/1213 | (2016.01) |
| H01M 8/04007 | (2016.01) |
| H01M 8/04089 | (2016.01) |
| H01M 8/04082 | (2016.01) |
| C25B 15/08 | (2006.01) |
| C25B 1/04 | (2006.01) |
| C25B 3/04 | (2006.01) |

(52) U.S. Cl.
CPC ............ *H01M 8/1213* (2013.01); *C25B 1/04* (2013.01); *C25B 3/04* (2013.01); *C25B 15/08* (2013.01); *H01M 8/04067* (2013.01); *H01M 8/04089* (2013.01); *H01M 8/04201* (2013.01); *Y02E 60/366* (2013.01); *Y02P 70/56* (2015.11)

(58) Field of Classification Search
CPC ........... H01M 8/04291; H01M 8/1213; H01M 8/04067; H01M 8/04089; H01M 8/04201
See application file for complete search history.

(56) References Cited

U.S. PATENT DOCUMENTS

| | | |
|---|---|---|
| 7,201,979 B2 | 4/2007 | McElroy et al. |
| 7,807,313 B2 | 10/2010 | Kaye et al. |
| 2004/0197239 A1 | 10/2004 | Mirkovic et al. |

(Continued)

OTHER PUBLICATIONS

Bents, "High Temperature Solid Oxide Regenerative Fuel Cell for Solar Photovoltaic Energy Storage," 22nd Intersociety Energy Conversion Engineering Conference, Aug. 10-14, 1987, NASA Technical Memorandum 89872, 18 pages.

(Continued)

*Primary Examiner* — Ula C Ruddock
*Assistant Examiner* — Frank A Chernow
(74) *Attorney, Agent, or Firm* — Sheridan Ross P.C.

(57) ABSTRACT

The present invention relates to a reversible solid oxide electrochemical cell that may operate in two modes: a discharge mode (power generation) and a charge mode (electrolytic fuel production). A thermal system that utilizes a SOFB and is inclusive of selection of operating conditions that may enable roundtrip efficiencies exceeding about 80% to be realized is disclosed. Based on leverage of existing solid oxide fuel cell technology, the system concept is applicable to energy storage applications on the kW to MW scale.

20 Claims, 5 Drawing Sheets

(56) References Cited

U.S. PATENT DOCUMENTS

| | | | |
|---|---|---|---|
| 2005/0048334 A1 | 3/2005 | Sridhar et al. | |
| 2005/0233188 A1 | 10/2005 | Kurashima et al. | |
| 2008/0107932 A1* | 5/2008 | Pham | C01B 3/38 |
| | | | 48/197 R |
| 2011/0071331 A1 | 3/2011 | Basset et al. | |
| 2012/0241678 A1 | 9/2012 | Valentin et al. | |
| 2012/0251912 A1 | 10/2012 | Braun et al. | |
| 2014/0194539 A1 | 7/2014 | Hammad et al. | |

OTHER PUBLICATIONS

McElroy et al., "Optimization & Demonstration of a Solid Oxide Regenerative Fuel Cell System," Technical Progress Report—Year 1, U.S. Dept. of Energy National Energy Technology Lab., Dec. 2004, 35 pages.

Petri, "Advanced Materials for RSOFC Dual Operation with Low Degradation," Versa Power Systems, DOE Hydrogen Program Review, Jun. 11, 2010, 21 pages.

"Versa Power, Boeing in DARPA contract for ultra-long-flight aircraft," Fuel Cells Bulletin, Jan. 2011, vol. 2011, issue No. 1, pp. 4-5.

Wendel et al., "Modeling and Design of a Novel Solid Oxide Flow Battery System for Grid-Energy Storage," 10th Europea SOFC Forum, Jun. 26-29, 2012, pp. 80-90.

Xu et al., "A novel solid oxide redox flow battery for grid energy storage," Energy Environ. Sci., 2011, vol. 4, pp. 4942-4846.

Official Action for U.S. Appl. No. 14/213,879, dated Jan. 29, 2016, 5 pages. Restriction Requirment.

Official Action for U.S. Appl. No. 14/213,879, dated Jun. 16, 2016, 10 pages.

Notice of Allowance for U.S. Appl. No. 14/213,879, dated Dec. 19, 2016, 8 pages.

Becker et al., "Production of Fischer-Tropsch liquid fuels from high temperature solid oxide co-electrolysis units," Energy, 2012, vol. 47, Iss. 1, pp. 99-115.

Official Action for U.S. Appl. No. 13/432,219, dated May 23, 2013, 8 pages.

Notice of Allowance for U.S. Appl. No. 13/432,219, dated Sep. 18, 2013, 11 pages.

Bierschenk et al., "High efficiency electrical energy storage using a methane-oxygen solid oxide cell," Energy Environ. Sci., Dec. 20, 2010, available at www.pubs.rsc.org/doi:10.1039/C0EE00457, 8 pages.

Wikipedia, "Sabatier reaction," Mar. 4, 2012, available at www.en.wikipedia.org/wiki/Sabatier_reaction, 3 pages.

Wikipedia, "Solid oxide fuel cell," Mar. 20, 2012, available at www.en.wikipedia.org/w/index.php?title=Solid oxide fuel cell &oldid=482944085, 11 pages.

Wikipedia, "Water gas shift reaction," Jan. 23, 2012, available at www.en.wikipedia.org/w/indiex.php?title=Water gas shift reaction & oldid=472764046, 3 pages.

Official Action for U.S. Appl. No. 13/432,219, dated Oct. 26, 2012, 8 pages.

\* cited by examiner

US 9,947,953 B2

HIGH EFFICIENCY, REVERSIBLE FLOW BATTERY SYSTEM FOR ENERGY STORAGE

CROSS REFERENCE TO RELATED APPLICATION

This application is a continuation-in-part of U.S. patent application Ser. No. 13/432,219, filed on Mar. 28, 2012, which claims the benefit of priority from U.S. Provisional Patent Application No. 61/468,312, filed Mar. 28, 2011. Each of these disclosures are hereby incorporated by reference in their entirety.

FIELD OF THE INVENTION

The present invention relates generally to electrochemical devices for energy storage. More specifically, the present invention relates to a reversible solid oxide electrochemical cell that may operate in at least two modes, a discharge mode and a charge mode and a method of using the same.

SUMMARY

The present invention contemplates a novel system, device, and methods for using a high efficiency reversible flow battery system for energy storage. More specifically, the present invention pertains to an innovative system design that incorporates a novel electrochemical device for energy storage and methods for using the same. In various embodiments, the novel device is a reversible solid oxide electrochemical cell that may operate in two modes: discharge mode (power generation) and charge mode (electrolytic fuel production). The reversible solid oxide cell is designated as a solid oxide flow battery (SOFB).

The novel SOFB device is distinct from both solid oxide fuel cells and flow batteries. The SOFB device is different than flow batteries in three primary ways: (i) the circulating fluid that is stored is not a liquid electrolyte, but is instead the reactant and product fluids derived from the electrode reactions at the anode and cathode, (ii) the storage fluids themselves are primarily gaseous (although water may be present in either liquid or gaseous forms for storage), and (iii) the operating temperature is much higher. The SOFB device is also different from solid oxide fuel cells (SOFCs) in that SOFBs operate reversibly rather than in one current direction, and at lower temperature and higher pressure compared to conventional SOFC technologies.

In various embodiments, the present invention comprises a thermal system that utilizes a SOFB and is inclusive of a selection of operating conditions that may enable roundtrip efficiencies exceeding about 80% to be realized. Based on leverage of existing solid oxide fuel cell technology, the system concept is applicable to energy storage applications on the kW to MW scale. Energy storage durations of between about 4-16 hours are expected to be the most likely application, but the actual storage capacity and duration periods are only limited by the size of the storage tanks themselves. In at least some embodiments, the present invention further comprises the basic system configuration, and in particular storage tank types and arrangement, and a range of desirable SOFB operating conditions.

At the system level of some embodiments of the present invention, the SOFB comprises high-performance heat exchangers and/or optional chemical reactors. In still another embodiment, a class of high-effectiveness all-ceramic microchannel heat exchangers is provided. In addition to heat-transfer performance, the ceramic design and fabrication technology leads to low manufacturing cost compared to metallic microchannel alternatives. In some embodiments, the SOFB performance may be enhanced by incorporating catalysts into the heat exchangers. Process embodiments wherein active catalyst washcoats are applied within the microchannels are also contemplated.

In some embodiments, a battery system is provided that may include multiple modes of operation. In some embodiments, a battery system is provided that may include a reversible solid oxide cell and at least one reactant storage tank in which the system may operate in the fuel cell mode or the electrolysis mode, and whereby the operation modes are reversible, thereby allowing the system to serve as an energy storage device and operate at low temperature and high pressure. The battery system may optionally comprise a reversible solid oxide cell stack for power generating (i.e. discharge) or fuel production (i.e. charge) and an integrated 'fuel' reactant storage tank. The storage tank may have a near constant pressure/variable volume characteristic, which may be realized by either partitioning the storage tank into two distinct storage zones that may be separated by a separation device, such as a free or floating piston, or through use of a bladder. In an embodiment, one side of the storage tank serves as the storage for SOFC 'fuel' (anode) gases (i.e. $CO_2$ and Steam), and the other side of the storage tank serves as the storage section for solid oxide electrolytic cell (SOEC) 'fuel' (cathode) gases (i.e. CO, $H_2$ and $CH_4$) and an oxidant storage tank is further provided for either gases or liquids.

DETAILED DESCRIPTION

The invention disclosed herein pertains to an innovative system design that incorporates a novel electrochemical device for energy storage. The device of the present invention is a reversible solid oxide electrochemical cell that may operate in at least two modes: discharge mode (power generation) and charge mode (electrolytic fuel production).

The reversible solid oxide cell is designated as a solid oxide 'flow battery'("SOFB"). The novel SOFB device has similarities to, but is distinct from, both solid oxide fuel cells and flow batteries. The SOFB device is different from flow batteries in three primary ways: (i) the circulating fluid that is stored is not a liquid electrolyte, but is instead the reactant and product fluids derived from the electrode reactions at the anode and cathode, (ii) the storage fluids themselves are primarily gaseous (although water may be present in either liquid or gaseous forms for storage), and (iii) the operating temperature is much higher. The reversible solid oxide cell is also different than SOFCs as it operates reversibly rather than in one current direction, and at lower temperature and higher pressure. In various embodiments, the present invention comprises a thermal system that utilizes a SOFB and further comprises a selection of operating conditions that may enable high roundtrip efficiencies exceeding about 80% to be realized. Based on leverage of solid oxide fuel cell technology, the system concept is applicable to energy storage applications on the kW to MW scale. Energy storage durations of between about 4 hours to about 16 hours are possible using the present invention, but the actual storage capacity and energy storage duration are only limited by the size of the storage tanks themselves. Thus, it is understood that the size of the storage tank may be any suitable size chosen for the application.

Figure 1:
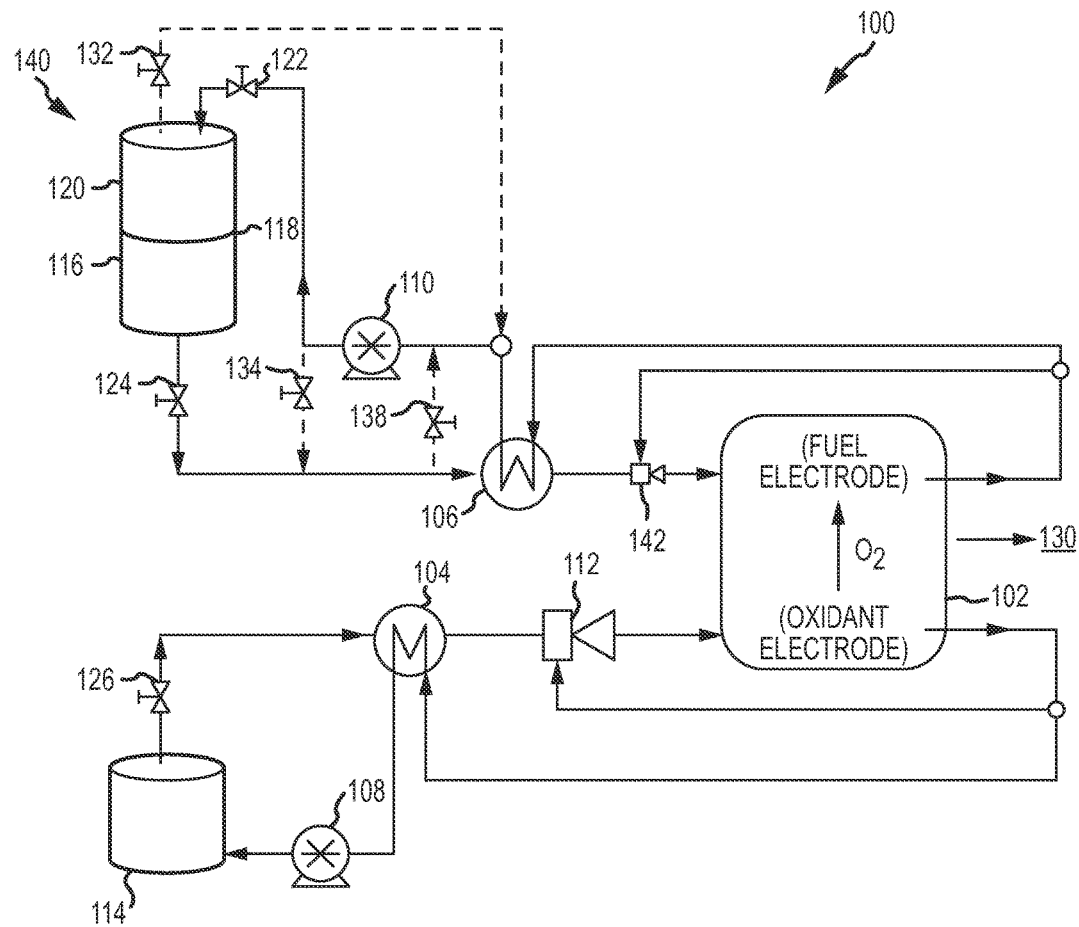
FIG. 1 illustrates an advanced energy storage device in the power generating mode.
Figure 2:
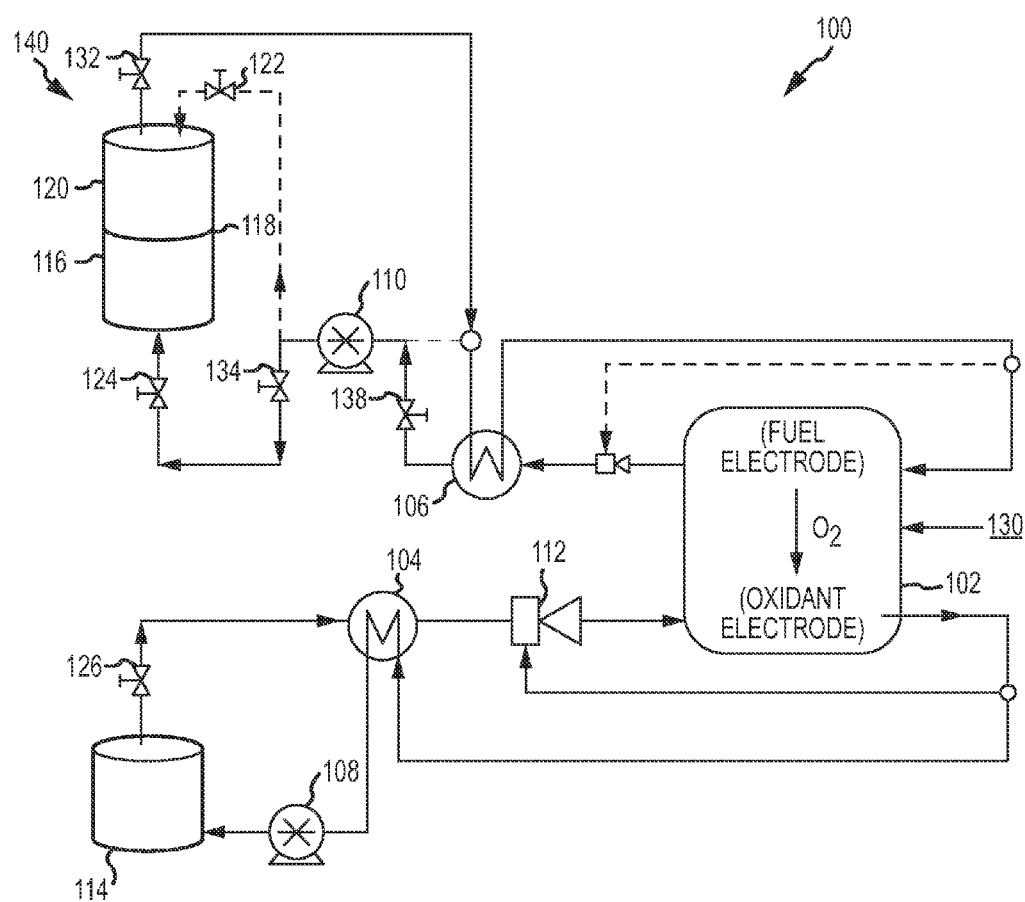
FIG. 2 illustrates an advanced energy storage device in the charge mode.

One embodiment of the invention is an advanced energy storage device, which is illustrated in FIGS. 1 and 2. FIG. 1 illustrates an advanced energy storage device in the discharge mode (fuel cell power generation mode), while FIG. 2 illustrates an advanced energy storage cell in the charging mode (electrolytic fuel production mode). FIG. 1 illustrates the flow path of fuel and product gases in the charging mode as dashed lines, which is discussed in further detail with reference to FIG. 2. It is also understood that the flow elements (132, 134, 138) shown on the dashed lines in FIG. 1 are in the closed position when the advanced energy storage device is in the power generating mode.

Power Generating (Discharge) Mode

With reference to FIG. 1, the advanced energy storage device is in the power generating, also known as the discharge mode. When the SOFB 102 is in the discharge mode, the anode is located at the fuel electrode and the cathode is located at the oxidant electrode. Realizing the novel concept of a high-efficiency, the reversible SOFB system requires an understanding of numerous system-level considerations. For example, the SOFB 102 illustrated in FIG. 1 operates nominally at a temperature between about 500° C. and about 800° C., in some embodiments at about 650° C. which may depend upon the operating conditions of the SOFB 102. The SOFB 102 generates power 130 in the discharge mode.

For the purposes of analysis, the fuel gas stored in the fuel storage tank 140, at least initially, may be approximated as a mixture of about 45% $H_2$, about 27% $H_2O$, and about 28% $CH_4$. Carbon monoxide is produced within the SOFB 102 and may eventually be present in the fuel storage tank 140. Gas products (comprising mainly of $CO_2$ and steam) of the SOFB reaction when the SOFB 102 is in the discharge mode are cooled and pumped into either a separate chamber of the fuel storage tank 140 (shown as SOEC 120), or are pumped into a single fuel storage tank 140. The $CO_2/H_2O$ produced may eventually be used when the system is charging (i.e., power consuming electrolysis operation as discussed with reference to FIG. 2).

The system 100 comprises a solid oxide flow battery module SOFB 102, oxidant heating element 104, fuel heating element 106, oxidant pump 108, fuel pump 110, an optional oxidant recycle device 112, an optional oxidant storage tank 114, and a fuel storage tank 140 (shown in FIG. 1 as a dual chamber tank comprising SOFC 116, SOEC 120 with a separation device 118). Several flow elements are also shown in FIG. 1, 124, 134, 138, 132, 122, 126. The flow element may be any suitable device, including valves, orifices and other flow elements known in the art.

The fuel storage tank 140 is a pressurized storage tank that allows for the capture of the fuel or reactant gases (including $CH_4$, $H_2$ and CO) and gas products ($CO_2$ and $H_2O$) used in the system 100. In some embodiments, the fuel storage tank 140 is shown as a tank with two chambers or a dual tank 116, 120. In the discharge mode, the SOFC tank 116 supplies the fuel gases to the system 100, while the SOEC 120 stores the product gases produced in system 100. In embodiments wherein the tanks are separated or divided by the separation device 118, the SOFC chamber 116 stores the fuel gas when the system 100 is in the charging mode, while the SOEC chamber 120 provides the product gases to the system 100. In other embodiments, the fuel storage tank 140 is a single mixed tank, whereby the product gases and the fuel gases are mixed in the storage tank 140. In still another embodiment, the fuel storage tank 140 may be a flexible, variable volume storage container, such as a bladder. In some embodiments, the fuel storage tank 140 further comprises a separation device 118. The separation device 118 allows for variable volume storage in the fuel storage tank 140. The separation device 118 may apply a pressure on the gases in the fuel storage tank 140 components to maintain a constant pressure to supply fuel or product gases downstream depending upon the mode of operation. The separation device 118 may be any suitable movable partition, such as a free or floating piston, a semi-permeable membrane, flexible balloon or through use of a bladder for example. The fuel storage tank 140 may optionally contain insulation to prevent heat loss and/or a heating element to overcome heat loss.

Flow elements 122, 124 and 132 may assist in controlling the filling and emptying process of the storage tank 140 through flow element control and plumbing arrangements. Flow element 124 controls the flow rate of fuel gases exiting fuel storage tank 140 (or SOFC chamber 116 if there are two different chambers) to heating element 106. The fuel gases passing through flow element 124 are at temperature and pressure conditions that are lower than the conditions of the fuel storage tank 140. The conditions of the fuel storage tank 140 are at a pressure of between about 5 bar to about 25 bar and at a temperature between about 10° C. and about 350° C. However, the temperature exiting the fuel storage tank 140 may depend upon a number of factors, including whether the steam in the fuel storage tank 140 remains as steam (humid gases), or has condensed into water, and if the existing water has been removed and stored separately or discarded, thereby leaving a dry gas in the storage tank 140. In order for the $H_2O$ to remain in the gaseous phase in the fuel storage tank 140, the components of the fuel storage tank 140 should exceed about 200° C. Thus, the temperature conditions of the fuel storage tank 140 are at a pressure of between about 5 bar to about 25 bar and at a temperature between about 10° C. and about 350° C. Other factors include whether there is a separation device 118 in the fuel storage tank 140 to separate the fuel gases from the product gases, or if the fuel and gases are stored in separate containers (SOFC 116 and SOEC 120).

The fuel gases may be throttled using the flow element or another suitable device prior to entering the heating element 106. The throttle decreases the pressure and temperature of the fuel gases to near the operating pressure of the SOFB 102 and thereby regulating the mass flow from the fuel storage tank 140. The type of fuel storage tank 140 (e.g. if the tank is a separated tank or pressurized with the separation device) may also help regulate the temperature and pressure of the fuel gases as they enter the heating element 106. For example, the separation device 118 may maintain the pressure and temperature of the fuel gases as the fuel gases exit the fuel separation tank 140 so that the temperature and pressure of the fuel gases entering the heating element 106 remain constant, which may thereby minimizing deviations in the temperature and pressure at the inlet of the SOFB 102. If the fuel separation tank 140 is a rigid tank, the amount of throttling may vary with time because the pressure in the fuel tank 140 may decrease as the fuel storage tank 140 empties. Furthermore, the flow element 124 may also need to be adjusted as the gases exit a rigid tank. A control element may be used to automatically adjust the gas flow through the flow element 124.

In the discharging mode, the heating element 106 warms the fuel gases to near the operating temperature of the SOFB 102. The operation parameters of the SOFB 102 may depend upon the desired use. In general, the SOFB 102 operates at a nominal temperature between about 500° C. to about 800° C., more typically between about 600° C. to about 700° C. and at a pressure between about 1 bar to about 20 bar. The temperature of the fuel gases that exit the heating element 106 may also vary depending upon the use and operating parameters of the SOFB 102, but typically enter the SOFB 102 at temperatures between about 550° C. to about 700° C. The heated fuel gases enter the SOFB 102 where it is electrochemically oxidized to produce electric power 130.

In some embodiments, a recycling unit 142 may be used to recycle fuel exiting the SOFB 102 to the inlet of the SOFB 102. Recycling the fuel may reduce storage and pumping requirements on the system 100. Recycling assists in fuel preheat, provides a means to recycle steam to reduce the potential for carbon formation, and lowers the amount of gas flow required from the storage tank 140 in order to maintain the SOFB at its desired nominal temperature when in discharge mode. The recycling unit 142 may be any suitable device, such as a gas ejector or recycle blower device.

In some embodiments, the heating element 106 and/or the heating element 104 comprises high-performance heat exchangers and/or optional chemical reactors. In still another embodiment, a class of high-effectiveness all-ceramic microchannel heat exchangers is provided. In some embodiments, the SOFB performance may be enhanced by incorporating catalysts into the heat exchangers. Suitable catalyst materials include nickel- and rhodium-based catalysts. In some embodiments, the heating device may be a reactive heating device depending upon the material sets employed in the SOFB 102.

The product gas leaving the fuel electrode enters the heating element 106 and is diverted to the pump 110. The product gas comprises $CO_2$ and steam and may also comprise small quantities of CO, methane and hydrogen. The product gas leaving the SOFB 102 at the fuel electrode may be used to heat the fuel gas in the heating element 106 that enters the SOFB 102. The temperature of the product gas leaving the SOFB 102 at the fuel electrode may depend upon the several operating and design variables, but may be near the nominal operating temperature of the SOFB 102. Some variables may affect the nominal operating temperature of the SOFB 102, including the configuration of the SOFB 102. For example, if the SOFB 102 is in a counter-flow configuration, cross-flow configuration, a co-flow configuration, or other configurations known in the art. The temperature of the product gas at the outlet of the SOFB 102 may also depend upon the fuel utilization factor in the SOFB 102, the operating voltage, and the amount of excess oxidant supplied at the oxidant electrode.

Pump 110 increases the pressure and temperature of the product gas to create a pressure differential so that the product gas flows into the fuel storage tank 140. Pump 110 is ideally located downstream from the heat exchanger 106. Because the product gases exiting the SOFB 102 are used to heat the fuel gases in heat element 106, the temperature of the product gases exiting the heat element 106 are lower than the temperature of the product gases entering the heating element 106. Thus, a high temperature pump may not be required. The pressure and temperature of the product gases exiting pump 110 are at a pressure and temperature greater than or equal to that of the fuel storage tank 140. In some embodiments, the temperature of the product gases exiting the pump 110 is between about 50° C. and about 350° C. The pressure exiting the pump 110 is between about 5 bar to about 25 bar. Flow element 122 may control the flow of the product gas to the fuel storage tank 140.

The oxidant entering the SOFB 102 assists in controlling the temperature of the SOFB 102. The oxidant is used in the reaction at the fuel electrode of the SOFB 102, which converts the methane, hydrogen and any CO that is present to $CO_2$ and $H_2O$. In an embodiment of the invention, the oxidant is pure oxygen, though it is understood that any suitable oxidant may be used, and may be discharged from an optional oxidant storage tank 114. In some embodiments, the oxidant storage tank 114 comprises relatively pure oxygen and the operating pressure is determined by the downstream flow element 126 and oxidant storage tank 114 combination. In some embodiments, air is the oxidant. In embodiments where air is the oxidant, an oxidant storage tank 114 may not be necessary. Rather, air may be drawn from the atmosphere and circulated through the system 100 using pump 108 which pressurizes the air. The temperature of the oxidant exiting pump 108 is at least about 10° C., but may be at least about 300° C. In some embodiments, the oxidant is produced from the oxidant electrode of the SOFB 102 when the system 100 is in the discharge mode. In still other embodiments, air and/or oxygen is mixed with an oxidant produced at the oxidant electrode of the SOFB 102 when the system is in the charging mode (see FIG. 2).

The flow of the oxidant may be controlled by flow element 126. Depending upon the source of the oxidant (i.e. the optional oxidant storage tank 114 or air), the temperature of the oxidant entering the pump 104 may be between about 10° C. to about 350° C. The oxidant, in any embodiment, is fed into the oxidant heating element 104. The oxidant leaving the oxidant electrode 102 may be used to heat the oxidant entering the SOFB 102 in heating element 104. The oxidant exiting the heating element 104 is between about 200° C. and about 700° C., more typically between about 300° C. to about 500° C. In some embodiments, the oxidant leaving the SOFB 102 may be recycled to the SOFB 102 inlet through the recycling unit 112, where the recycled oxidant may be combined with preheated oxidant exiting the heating element 104. Thus, the temperature of the oxidant entering the SOFB 102 may depend upon the whether the optional recycling unit 112 is utilized. The temperature of the oxidant entering the SOFB 102 is typically between about 200° C. and about 700° C. and the pressure of the oxidant is between about 5 bar to about 15 bar.

In the discharge mode, some excess oxygen (i.e., above stoichiometric requirements) is supplied to the SOFB 102 to maintain the desired operating temperature. Because the mass flow of the oxidant through the oxidant electrode of the SOFB 102 is much greater than the mass flow of the oxidant entering the heating element 104, the mass flow of the oxidant entering the SOFB 102 may be regulated using the mass flow of the oxidant exiting the SOFB 102. Thus, if the optional recycling unit 112 is used, then the temperature of the oxidant exiting the recycling unit 112 is between about 500° C. to about 700° C. Again, the actual temperature may depend upon the operating conditions of the SOFB 102. The temperature of the oxidant exiting the SOFB 102 may be greater than the nominal temperature of the SOFB 102, which is between about 550° C. to about 700° C., more typically between about 600° C. Furthermore, the temperature rise across the oxidant electrode in the SOFB 102 (i.e.

from the inlet to the exit of the oxidant electrode) may be between about 100° C. and about 200° C., regardless of the operating temperature of the SOFB 102. A small fraction of the supplied oxygen may be returned to the oxidant storage tank 114 via the oxidant pump 108 and/or may also be discharged to the atmosphere.

Design considerations include establishing (i) the appropriate SOFB 102 operating conditions (e.g., voltage, T, p, fuel utilization), (ii) desired tank 140 operating conditions (T, p, and composition), (iii) thermal management of the SOFB 102, and (iv) ensuring that parasitic pumping power requirements are minimized to enable maximum system efficiency. The operating temperature of the SOFB 102 is between about 500° C. to about 700° C. The operating pressure is between about 1.5 bar to about 20 bar and the fuel utilization is between about 30 to about 95%.

Charging Mode

FIG. 2 illustrates an advanced energy storage cell in the charging mode, whereby power 130 supplied to the SOFB 102 and is used to charge the fuel storage tank 140. In the charging mode, the polarity of the SOFB 102 changes compared to the polarity in the discharge mode such that the fuel electrode is a cathode and the oxidant electrode is an anode. The flow path of the fuel gases and product gases in the discharge mode are shown as dashed line and discussed in detail in FIG. 1. The flow element (122) shown on the dashed line is in a closed position when the system is in charging mode.

The fuel storage tank 140 discharges the product gases ($CO_2$ and steam). Flow element 132 regulates the flow rate of the product gases leaving the fuel storage tank 140. A throttle may be used to lower the temperature and pressure from the fuel storage tank 140. Heating element 106 heats the product gases prior to entering the SOFB 102 at the fuel electrode. The heating element 106 may be the same heating element 106 used in the discharge mode (FIG. 1) or may be a different heating element 106. Furthermore, the product gas may be recuperatively preheated to about between about 525° C. to about 625° C., preferably about 550° C. by the fuel gas (anode tail-gas) and delivered to the SOFB 102.

Following heating in the heating element 106, the preheated product gas enters the SOFB 102. The operating conditions of the SOFB 102 are typically at a temperature between about 600° C. and about 800° C. and a pressure of between about 1 bar and about 20 bar. However, it is understood that the actual operating conditions may depend upon the SOFB requirements, which will depend upon the actual use, size and other factors that a person having ordinary skill in the art would understand, appreciate and be able to determine without undue experimentation.

Under pressurized operating conditions, the hydrogen and carbon monoxide electrochemically produced present thermodynamically favorable conditions to generate considerable amounts of methane. The reactant gas mixture (i.e. the gas exiting the fuel electrode of the SOFB 102 in the charging mode), established from the fuel electrode of the SOFB 102 produced when the fuel cell is in the charging mode, comprises approximately of about 9% $H_2$, about 71% $H_2O$, about 6% $CH_4$, about 1% CO, and about 13% $CO_2$. The methane may amount to greater than about 40% of the resulting 'fuel' composition on a volume basis. In this simple example, the electrolysis mode of operation is estimated to achieve an electrolytic efficiency of about 90% at about 10 atm operation. The electrolyzer efficiency is defined as the change in heating value of the anode gas from inlet to outlet divided by the gross DC power added to the SOFB system. This high efficiency translates into an overall round-trip system efficiency of nearly about 80% from the system concept and conventional higher temperature materials set (i.e., yttria-stabilized zirconia (YSZ)).

Preferably, methane reformation of the fuel gas occurs in the SOFB 102 at the fuel electrode. However, in some embodiments, the fuel electrode may not allow for reformation to occur within the SOFB 102, for example, if the fuel electrode is copper ceria-based or employs other poor fuel reforming electrode material sets known in the art. In order to reform the fuel, an optional reactor may be included between the fuel electrode outlet of the SOFB 102 and the heating element 106. In embodiments where reformation is beneficial or required, heating element 106 may be a reactive heat exchanger device. The reactor favors and promotes methanation and changes the energy density of the fuel gases. In other words, the reactor increases the energy density by flowing the fuel gases over a catalyst that favors methanation.

The fuel gases exit the heating element 106 to pump 110. Pump 110 may be the same pump as used in the discharge mode or may be a different pump 110. Optionally, the flow may be controlled with flow elements 138 and 134, which are positioned before and after the pump 110. Optional flow elements 124 control the flow of the fuel gases into the fuel storage tank 140.

Oxidant may be supplied to the SOFB 102. In an embodiment of the invention, the oxidant is pure oxygen, though it is understood that any suitable oxidant may be used, which may be discharged from an optional oxidant storage tank 114. In some embodiments, air is the oxidant. In embodiments where air is the oxidant, an oxidant storage tank 114 may not be necessary. Rather, air may be drawn from the atmosphere and circulated through the system using pump 108 which pressurizes the air. The temperature of the oxidant entering pump 108 may be between about 10° C. to about 350° C. In some embodiments, the oxidant may be produced from the oxidant electrode when the system 100 is in the charging mode. In some embodiments, the ambient air may be enriched with another oxidant. In still other embodiments, air and/or oxygen are mixed with an oxidant produced at the oxidant electrode when the system 100 is in the discharge mode.

The flow of the oxidant may be controlled by flow element 126. Depending upon the source of the oxidant (i.e. the optional oxidant storage tank 114 or air), the temperature of the oxidant may be between about 10° C. to about 350° C. The oxidant, in some embodiments, is fed into the oxidant heating element 104. The temperature of the oxidant gas may depend upon the operating temperature of the SOFB 102.

The preheated oxidant may optionally enter a recycling unit 112, where oxidant generated from the oxidant electrode of SOFB 102 is recycled to the recycling unit 112. Because the mass flow of the oxidant generated from the oxidant electrode of the SOFB 102 is much greater than the mass flow of the oxidant entering the heat exchanger 104, the mass flow of the oxidant entering the SOFB 102 is regulated using the mass flow of the oxidant generated from the oxidant electrode of the SOFB 102. Recycling assists in oxidant preheat and lowers the amount of gas flow required from the storage tank in order to maintain the SOFB at its desired nominal temperature when in discharge mode. The recycling unit 112 may be a gas ejector or recycle blower device.

In another embodiment, no oxidant is supplied to the SOFB 102 in the charging mode. Since oxygen (via charge transfer reactions at the fuel electrode-electrolyte interface)

is removed from the product gases and transferred to the oxidant electrode side of the SOFB 102 in electrolytic operation, a 'fresh' supply of oxidant at the SOFB 102 inlet may not necessarily be required. In this embodiment, the oxidant flowing through the oxidant electrode compartment is the oxygen produced by the applied electric current and the associated charge transfer reactions within the SOFB 102. The electrolytic reaction is endothermic and excess oxidant gas cooling flow may not therefore be required depending on the selected SOFB operating conditions. In other words, no oxidant is preheated through heating element 104 and directed either to the recycling element 112 or directly to the SOFB 102. In these embodiments, the heating element 104 may still be used to remove heat and oxidant produced in the SOFB 102. Thus, in some embodiments, heating element 104 is a fan-cooled heat exchange element. In some embodiments, the heating element 104 directs the heat produced in SOFB 102 to the heating element 106 in order to assist in heating the product gases ($CO_2$ and steam) that enter the SOFB 102 at the fuel electrode in the charging mode.

An aspect of the present invention is that the SOFB is operational in at least two modes that are reversible. In order to ensure reversible operation over the life of the system requires that when the SOFB 102 is discharged in the fuel cell operating mode, the resulting anode tail-gas composition is suitable for electrolyzer operation. Likewise, when reversing the operating mode, the anode exhaust gas composition produced from electrolysis serves as the fuel for discharging mode. Thus, the 'fuel' (whether fuel gases or product gases) may be returned to the fuel storage tank 140 as close as is possible to its initial composition in order to achieve a quasi-steady-state roundtrip operation over several operating cycles.

System analyses indicates the net SOFB system efficiencies of greater than about 85% are possible in fuel cell operating mode at about 650° C. on standard anode-supported YSZ material sets. Net system efficiency is defined herein as net DC power delivered by the system divided by fuel energy (LHV-basis) supplied from the SOFC storage tank. Such high-efficiency is achievable by a combination of low cell over potential (approximately 100 mV) operating point selection, high operating pressure, near-pure oxygen as the oxidant, and careful system architecture that minimizes pumping parasitics. Such high-efficiencies are also possible as the system is not penalized for low fuel utilizations. The importance of system operating pressure is not to be underestimated for a variety of reasons which become clear when considering both discharging and charging SOFB operating modes.

FIG. 3 illustrates optimal system efficiency with varying fuel utilization and system operating pressure. Pressurization of the system may increase net efficiency by about 20-percentage points, which is critical to achieving the goal of greater than about 80% roundtrip efficiency. Second, high system pressures favor low parasitic power and smaller storage tank requirements for a given discharge run-time. For instance, it is estimated that about a five time reduction in tank pumping power requirements may be realized when operating the system at about 10 atm versus about 1.1 atm due to the reduced required pressure ratios across the pumping device. Additionally, in electrolysis charging-mode high pressure operation favors the production of methane, which vastly improves both thermal management of the SOFB stack and the energy density of the fuel. Because of the lack of fuel reforming, combustors, excessively high temperature heat exchangers, and the need to achieve high reactant utilizations for the sake of efficiency, high SOFB efficiencies may be realized with relatively simple and elegant system concepts.

Figure 3A:
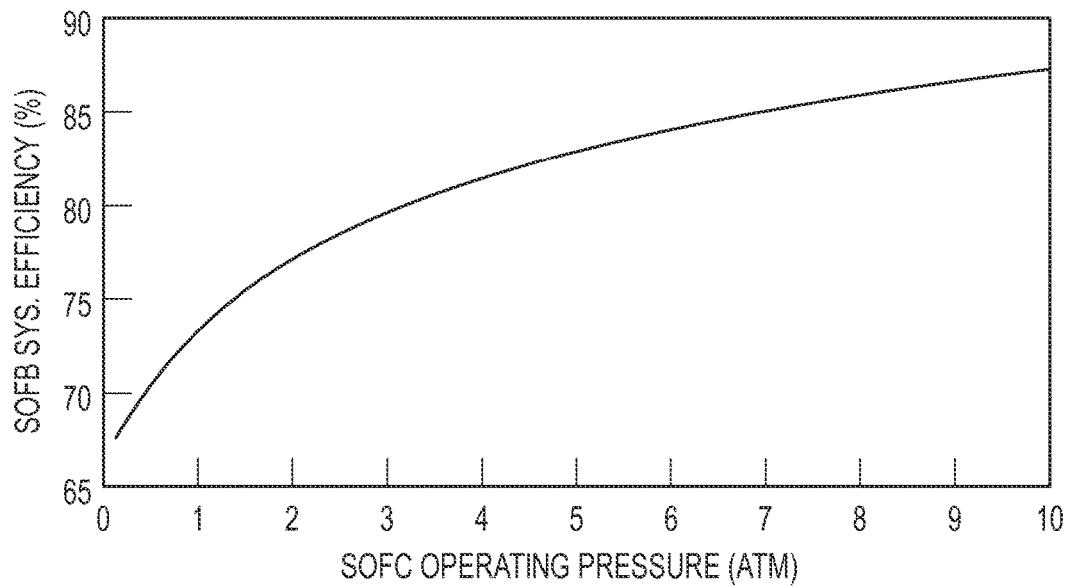
FIG. 3 illustrates optimal system efficiency with varying fuel utilization and system operating pressure.

FIG. 3a illustrates a SOFC operating pressure and SOFB system efficiency. The temperature of the SOFC illustrated in FIG. 3a was approximately 650° C. The pressure in the SOFC tank (separated fuel storage tank) was approximately 25 atm and the fractional fuel utilization, $U_f$, was approximately 53%. As the operating pressure of the SOFC increased, the SOFB system efficiency also increased. Operating the SOFB in electrolysis mode requires considerations of reactant storage and preheat, pumping power, and achieving self-sustaining thermal operation of the system. In particular, maintaining cell temperature during the highly endothermic electrolysis operating mode is a primary concern and several strategies are possible. These methods include transferring thermal energy from higher temperature reactant gases to the cell, thermal storage in the mass of the SOFB module, and operating at high overpotential, thereby providing resistive heating. These strategies result in either large inefficiencies or limit charge/discharge times. Fortunately, increasing operating pressure favors the production of methane, which is a highly exothermic reaction that tends to provide a more thermoneutral operating condition for the cell-stack. This effect may be quantitatively seen from the data in Table 1 which summarizes the heats of reaction at about 650° C. for electrolysis, water-gas shift, and methanation (i.e., reverse reforming and Sabatier reactions).

TABLE 1

Heats of Reactions

| Reaction | $\Delta H°_{923}$ (kJ/mol) |
|---|---|
| $H_2O \leftrightarrow H_2 + 0.5O_2$ | 247.3 |
| $CO_2 \leftrightarrow CO + 0.5O_2$ | 282.9 |
| $3H_2 + CO \leftrightarrow CH_4 + H_2O$ | −224.4 |
| $4H_2 + CO_2 \leftrightarrow CH_4 + 2H_2O$ | −188.8 |
| $CO + H_2O \leftrightarrow CO_2 + H_2$ | −35.6 |

Figure 3B:
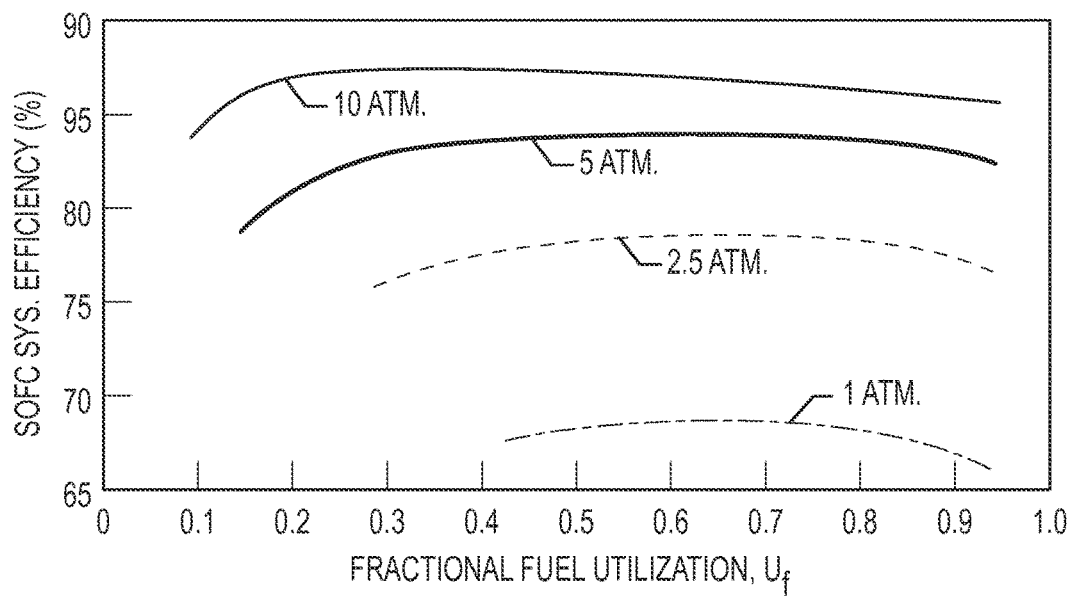

FIG. 3b illustrates the SOFC system efficiency as a function of the fractional fuel utilization over several pressures. The overpotential was about 100 mV and the temperature of the SOFC was about 650° C.

Figure 4:
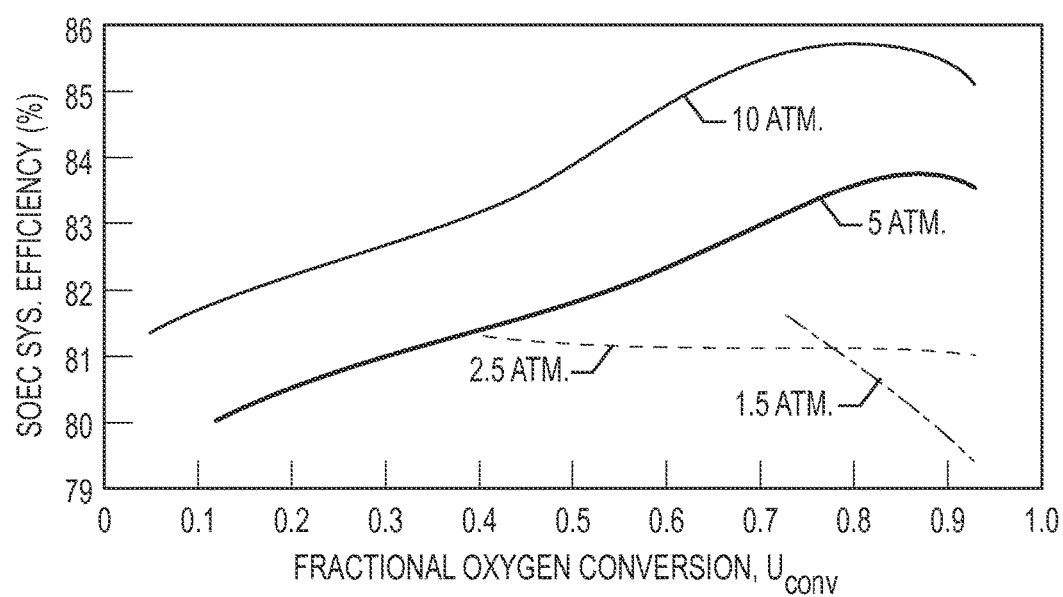
FIG. 4 illustrates the SOEC system efficiency as a function of the fractional oxygen conversion $U_{conv}$.
Figure 5:
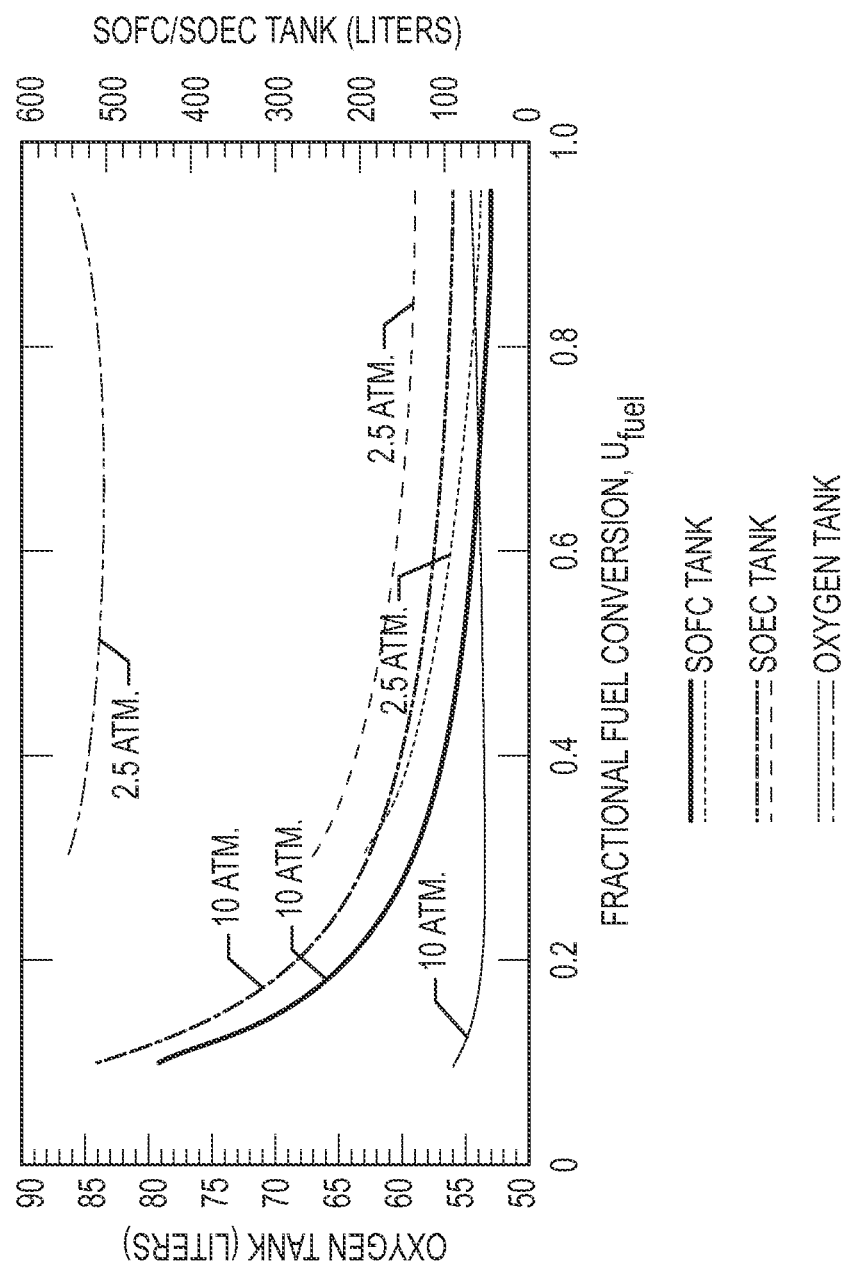
FIG. 5 illustrates oxygen, SOFC, and SOEC tank sizing for system operation at about 2.5 atm and about 10 atm.

FIG. 4 illustrates the SOEC system efficiency as a function of the fractional oxygen conversion $U_{conv}$ and further supports the importance of elevated operating pressure on system performance and, importantly, indicates compatibility with the pressure selection in fuel cell operating mode.

Furthermore, one may see from FIG. 4 the effect of lower pressure operation on maintaining high efficiency performance as a function of fractional reactant conversion. Several operating pressures are illustrated on the graph. As more of the reactants are converted to 'fuel' by electrolysis, the system efficiency increases as the relative gain in fuel heating value exceeds the required electrical energy input. The situation is complicated by the fact that at lower pressures less methanation occurs and electrolytic efficiency is altered; eventually, fuel production is offset by power requirements and limits in achieving thermally self-sustaining operation (see curves for 2.5 atm and 1.5 atm operation).

Maintaining thermal control and elevated operating temperature are important design considerations. The thermal behavior of the stack is normally different in fuel-cell mode than in electrolysis mode. As a fuel cell, both the cell reaction and the polarization are exothermic, producing net excess heat. As an electrolyzer, the cell reaction is endothermic while the polarization losses remain exothermic. Thus, maintaining operating temperature during electrolysis usually requires heat produced by high overpotentials that result in low efficiency. On the other hand, there is usually considerable excess heat to be dissipated in fuel cell mode. Furthermore, the operating voltage of the cell may be set to a level near the thermoneutral voltage condition (about 100 mV polarization) to generate enough waste heat to be thermally self-sustaining.

The present innovation allows a more thermally-balanced situation with the thermally-neutral voltage near the Nernst potential such that there is net heat production in both electrolysis and fuel cell modes. Calculations for electrolysis at elevated pressure and reduced temperature show that net heat production begins at overpotentials less than about 0.1 V due to highly exothermic methane formation. This important result provides further compelling evidence at the stack-level for operating the SOFB at elevated pressures. There is ample evidence that fuel-cell stacks and systems may be sufficiently insulated to maintain self-sustaining operation even under high efficiency, low polarization conditions.

Unique attributes of the SOFB system of the present invention include both the pressurized storage of gaseous reactants and the manner in which a constant pressure storage characteristic is achieved within the system. Storage tanks have been sized based on a 4-hour discharge time at a nominal capacity of about 1 kW net DC power output. FIG. 4 illustrates oxygen, SOFC, and SOEC tank sizing for system operation at about 2.5 atm and about 10 atm. Tank storage pressure is based on SOFB operating pressure plus a fixed approximately 15 bar pressure rise across the pumps.

For instance, at about 60% fuel utilization, approximately 208 liters (about 55 gal) of total reactant storage at about 25-atm is required for an about 4-kWh rated system. Operation at about 2.5 atm requires about 322 liters (about 85 gal) of total storage.

Storage tanks introduce an inherently dynamic element into the system operation and deserve careful consideration in design and operating control. As gases are either removed or added to the tank, the thermodynamic state of the tank changes with time. Additionally, such changes during tank discharge result in a time-varying enthalpy of the gas as it flows into the reactant preheaters. Thus, while system pressure may be controlled by a pump and control valve, tank outlet gas temperature needs to be effectively managed for heat exchanger operation and temperature control into the SOFB.

Previous experience in the design of air-independent SOFC systems suggest that cathode gas recycle via an ejector may provide a means for effective cathode inlet temperature control. Oxygen tank pressure may gradually decrease during SOFC operating mode, but the tank temperature and pressure decrease is mitigated somewhat by the return of 'depleted' cathode gases to the tank by the oxidant pump. On the fuel side, a novel concept for the use of single fuel tank in which the SOFC and SOEC compartments are separated by a moveable partition, such as a floating or free piston may offer some additional advantages in tank sizing and temperature and pressure control when switching between operating modes.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims.

Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A method of storing and utilizing a fuel in a battery system, the method comprising:
   providing a reversible solid oxide cell, wherein the reversible solid oxide cell is capable of operating in a charging mode and in a discharge mode;
   when the reversible solid oxide cell is in the discharge mode, providing a stored fuel gas to a fuel heating element from a fuel storage tank, wherein the fuel heating element provides a heated fuel gas;
   providing the heated fuel gas to the reversible solid oxide cell, wherein the reversible solid oxide cell produces power and a product gas in the discharge mode;
   providing the product gas to a product gas heating element to cool the product gas, and produce a cooled product gas;
   providing the cool product gas to a pump, wherein the pump increases the temperature and pressure of the cooled product gas to approximately the temperature and pressure of stored product gases in a product gas storage tank;
   when the reversible solid oxide cell is in the charging mode, providing the stored product gas from a storage tank to a product gas heating element to produce a heated product gas;
   providing the heated product gas to the reversible solid oxide cell, wherein the reversible oxide cell generates the fuel gas;
   providing the fuel gas to a fuel gas cooling element, wherein the fuel gas cooling element cools the fuel gas to produce a cooled fuel gas;
   providing the cooled fuel gas to a cooled fuel gas pump, wherein the cooled fuel gas pump increases the temperature and pressure of the cooled fuel gas to approximately the temperature and pressure of the stored fuel gas; and
   storing the stored fuel gas in the fuel storage tank.

2. The method of claim 1, wherein a temperature of the heated fuel gas is between about 500° C. to about 700° C.

3. The method of claim 1, wherein the fuel storage tank and the product storage is a single mixed tank, wherein the stored fuel gas and the product gas are mixed to form a mixed gas within the single mixed tank.

4. The method of claim 1, further comprising when the reversible solid oxide cell is in the discharging mode, providing an oxidant to the reversible solid oxide cell.

5. The method of claim 4, further comprising:
   providing the oxidant to an oxidant heating element to produce a heated oxidant; and
   providing the heated oxidant to the reversible solid oxide cell, wherein the reversible solid oxide cell produces a fuel cell oxidant.

6. The method of claim 4, further comprising a recycling element.

7. The method of claim 6, wherein the recycling element provides a fuel cell oxidant to the reversible solid oxide cell.

8. The method of claim 1, wherein the oxidant heating element is a fan, and wherein the fan provides a heat source to the fuel heating element.

9. The method of claim 1, wherein an operating temperature of the reversible solid oxide cell is between about 500° C. to about 800° C.

10. The method of claim 1, wherein the stored fuel is provided to the fuel heating element from the fuel storage tank at a constant pressure.

11. The method of claim 1, wherein an anode is located at a fuel electrode and a cathode is located at an oxidant electrode when the fuel cell is in the discharge mode.

12. The method of claim 1, wherein the product gas comprises carbon dioxide and steam.

13. The method of claim 1, further comprising throttling the stored fuel prior to providing the stored fuel to the heating element.

14. The method of claim 1, further comprising providing the product gas to the fuel heating element to heat the stored fuel.

15. The method of claim 5, wherein a temperature of the heated oxidant is between about 200° C. and about 700° C.

16. The method of claim 4, further comprising:
providing an exiting oxidant exiting the reversible solid oxide cell to a recycling element;
providing the oxidant to an oxidant heating element to produce a heated oxidant; and
combining the exiting oxidant with the heated oxidant to produce a heated recycled oxidant; and
providing the heated recycled oxidant to the reversible solid oxide cell, wherein the reversible solid oxide cell produces a fuel cell oxidant.

17. The method of claim 1, further comprising providing an excess oxygen to the reversible solid oxide when the reversible solid oxide is in the discharge mode to maintain an operating temperature.

18. The method of claim 1, wherein a cathode is located at a fuel electrode and an anode is located at an oxidant electrode when the fuel cell is in the charging mode.

19. The method of claim 4, further comprising mixing the oxidant with a second oxidant.

20. The method of claim 19, wherein the oxidant is air, and wherein the second oxidant is at least one of air or oxygen.

* * * * *